Sept. 9, 1969

T. H. KRUEGER 3,465,629

MOTOR DRIVEN TAPE DISPENSER

Filed July 7, 1967

INVENTOR.
THEODORE H. KRUEGER
BY
McGlew & Toren
ATTORNEYS

Sept. 9, 1969     T. H. KRUEGER     3,465,629

MOTOR DRIVEN TAPE DISPENSER

Filed July 7, 1967     7 Sheets-Sheet 2

FIG. 2

INVENTOR.
THEODORE H. KRUEGER
BY
*Molskew & Toren*
ATTORNEYS

Sept. 9, 1969 T. H. KRUEGER 3,465,629
MOTOR DRIVEN TAPE DISPENSER

Filed July 7, 1967 7 Sheets-Sheet 5

INVENTOR.
THEODORE H. KRUEGER
BY
McGrew & Toren
ATTORNEYS

Sept. 9, 1969
T. H. KRUEGER
3,465,629
MOTOR DRIVEN TAPE DISPENSER

Filed July 7, 1967
7 Sheets-Sheet 6

FIG. 8

INVENTOR.
THEODORE H. KRUEGER
BY
McGlew & Toren
ATTORNEYS

INVENTOR.
THEODORE H. KRUEGER
BY

McGlew & Toren
ATTORNEYS

United States Patent Office 3,465,629
Patented Sept. 9, 1969

3,465,629
MOTOR DRIVEN TAPE DISPENSER
Theodore H. Krueger, deceased, late of Stratford, Conn., by Cecelie M. Krueger and Howard L. Moore, Stratford, and Theodore H. Krueger, Jr., Woodbridge, Conn., and Chemical Bank New York Trust Company, New York, N.Y., executors, assignors to Better Packages, Inc., Shelton, Conn.
Filed July 7, 1967, Ser. No. 658,583
Int. Cl. B26d 5/20; B65h 17/20
U.S. Cl. 83—205
15 Claims

ABSTRACT OF THE DISCLOSURE

A single embodiment of tape dispenser is described herein which includes an electric motor driven feed for feeding tape from a roll supply contained in a housing of the machine past means for severing the tape and over means for moistening the tape. The feed mechanism includes an upper feed wheel which is rotatably mounted on a fixed motor driven shaft and its periphery overlies the top surface of the tape to be fed. A lower cooperable counter feed roller is mounted on a pivot lever system which is raised during the feeding cycle by the depression of an operating arm or lever to bring it into engagement with the tape against the upper feed roller so that feeding will commence. The depression of the manually operated operating arm also causes the switching on of a motor to drive the upper feed roller, which, because of the upward pressure of the lower feed roller will effect the feeding of the tape.

---

A feature of the invention is that the tape is dispensed by an electric feed drive which may be operated entirely manually or with the use of only a single switching element to start and stop the driving motor. In some instances, it is desirable to eliminate the switch entirely and permit a constant rotation of the motor during the time that the device is connected to a source of power.

A further feature of the invention is that when the lever operating arm is depressed, it causes engagement of the lower feed rollers with the tape below the upper feed roller and also raises the severing blade of the cutting device to a location above the path of feed of the tape. Thus, no electrical operating means are required for raising and lowering the severing blade.

A further feature of the construction is that the actuating lever is provided with a crank arm portion with a roller element which rides under an actuating yoke. The yoke is biased downwardly against the roller. The actuating lever in the actuated position is oriented such that the roller is moved beyond a "dead-center" position so that it is held or locked in an actuated position by the yoke after the lever has been once moved to this position.

Connected to the feed mechanism is a mechanically operated timing or measuring mechanism for measuring the length of tape which is to be fed during each depression of the operating lever. This mechanism includes a control or measuring wheel which is rotated against the force of a clock spring away from a stop member by an amount comparable to the amount of tape which is to be dispensed. A control nut member extends outwardly from a slot in the housing for the purpose of shifting the measuring wheel and indications are advantageously provided around the periphery of the slot to show the actual linear dimension of the tape which will be dispensed in accordance with the positioning of the nut member around the circumference of the slot. During the connection of the feed system to feed the tape through the cutter and over the moistening element, the measuring or control wheel is connected to the drive shaft for the upper roller preferably through one or more interchangeable speed gears which may be changed for varying the range of lengths of tapes fed, for example, from ten inches to 160 inches or 20 inches to 265 inches. The measuring wheel is rotated by a friction wheel driven by the train of gears during the time at which the feed wheels grip and feed the tape. The electric driving motor will continue to run until the measuring wheel moves the operating lever to disengage it from the yoke and to return the lever to a rest position. The yoke will continue to drop to its rest position to cause actuation of the motor switch to stop the motor. This will also cause a disengagement of the friction disc with the measuring wheel. When the yoke drops downwardly it also carries with it the moving blade which moves through the path of the tape to sever the tape. The length of tape which is dispensed is proportional to the angular movement of the disc.

BRIEF SUMMARY OF THE INVENTION

This invention relates, in general, to apparatus for dispensing a length of strip or tape material and, in particular, to a new and useful motor driven tape dispenser which is set to automatically dispense a preselected length of tape upon actuation of an actuating lever.

The present invention is particularly directed to a tape dispenser of a type which may be set by the operator to dispense a tape of a selected length until the machine is reset to dispense a different length. The present invention is an improvement over the prior art, particularly in respect to the simple mechanically operated mechanism for initiating the feed of the tape, selecting the length of tape which will be fed during the feeding, and cutting the tape using a mechanical arrangement of the parts which permits operation without any switch controls or with only a single switch for starting and stopping the driving motor. The machine thus constructed may be made simply and of rugged and inexpensive construction.

In accordance with a feature of the invention, there is provided an operating lever which is pivoted in the housing and is mounted on a shaft which includes an offset arm portion which engages and lifts up a yoke member which is biased downwardly by a spring. The lever member is movable in a slot at one end of the housing such that it may be pressed downwardly within the slot range to cause the roller on the offset arm portion to ride beyond a dead-center position and to engage and lift up the yoke member. This same action causes the engagement of a lower feed roller with an upper feed roller, the raising of the cutter knife so that the cutter is moved above the path of the tape being dispensed, the driving engagement of a measuring wheel or device for determining the length of tape which will be fed and the switching on of the driving motor to connect the feed rollers in those instances where the machine is adapted for an intermittent electric motor drive operation rather than a continuous motor operation. A further feature of the construction is that the lever will remain in an operative position held by the downward force of the yoke member on the roller of the offset lever portion of the operating arm until the feed cycle is completed in which case the measuring means will move it backwarrdly to its initial at rest position at which it advantageously is oriented to extend upwardly from one end of the housing.

The measuring device advantageously includes a measuring wheel member which is frictionally engaged through interchangeable speed gears to rotate in a direction back toward a stop member from which it is displaced to provide the initial setting in accordance with the length of tape which is dispensed. Once the wheel member is set, it remains in the set orientation and it will operate every time the operating lever is dispensed to dispense the same length of tape until it is reset to a new position.

Accordingly, it is an object of the invention to provide a motor driven tape dispenser having simple mechanical control means for feeding cutting and dispensing a selected length of tape.

A further object of the invention is to provide a tape dispenser which is advantageously driven by a motor which may be continuously operated or operated intermittently and which includes means for setting the machine mechanism for dispensing a selected length of tape, and wherein each tape dispensing cycle is initiated by depressing an operating lever by hand.

A further object of the invention is to provide a tape dispensing device wherein after the hand operated lever is depressed, a driving motor is switched on to rotate an upper driving wheel, a lower driving wheel is moved to engage beneath the upper driving wheel and below a length of tape to advance the tape between the wheels, a measuring device is connected through interchangeable gearing to measure the amount of tape which is being fed and to move the operating lever back to an initial neutral position and to cause cutting of the tape at the end of the feed cycle.

A further object of the invention is to provide a tape cutting mechanism which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

DETAILED DESCRIPTION

Referring to the drawings, in particular, the invention embodied therein comprises a motor driven tape dispenser including spaced side frames 10 and 12 which are spaced and held rigidly in position by means of cross plate members 14, 16, 18, 20 and 22 (FIG. 2), all of which are secured to the side frames such as by rivets or bolts which extend through upright side portions of these cross frames. Plate 14 which extends upwardly adjacent the bottom rear portion of the machine, together with the inclined plate 22, forms a basket or container for a roll of tape 24. The tape roll 24 is centered within the basket by laterally adjustable guide plates 28, 28 arranged on the respective sides of the tape. Each plate 28 includes a slot 30 to permit the plate to be engaged over a tie rod 32 (see FIGS. 2 and 3).

A length of tape 34 is drawn over a lift roller 36 and over a table formed by the plate 20 and beneath a tape plate 38 and between an upper feed roller 40 and a lower feed roller 42 which are separable when the tape is not being fed. When the tape is fed, it is fed into association with cutting means 44 and moistening means 45 and then projected outwardly from the housing. The cutting means 44 includes a movable guillotine-type blade or movable cutter 46 which is movable through the path of feed of the tape and a retractable shear 48 which is mounted on a bracket 50 and urged by a tip spring 52 in a direction toward engagement with the movable cutter 46. The shear 48 may move in a retraction movement slightly during the downward cutting movement of the cutter 46. A roller 54 is held against the cutter 46 adjacent each side frame 20 and they are rotatable on a cross shaft 56. The rollers 54, 54 act as a guide for the moving cutter 46 and resist the pressure of the tip springs 52 acting through the shear 48 on the moving cutter.

The moistening means 45 comprises a water tank 58 in which is mounted a plurality of brush assemblies 60 over which the tape 34 passes when it is fed. A pressure plate 62 is pivoted on a cross shaft 56 and it carries a plurality of weights or slugs 64 in a curved end portion 62a which weight the plates 62 downwardly to force the tape being fed into pressure engagement with the edges of the brushes 60. The number of slugs 64 may be varied in order to control the pressure of the plate 62 against the tape 34.

Figure 3:
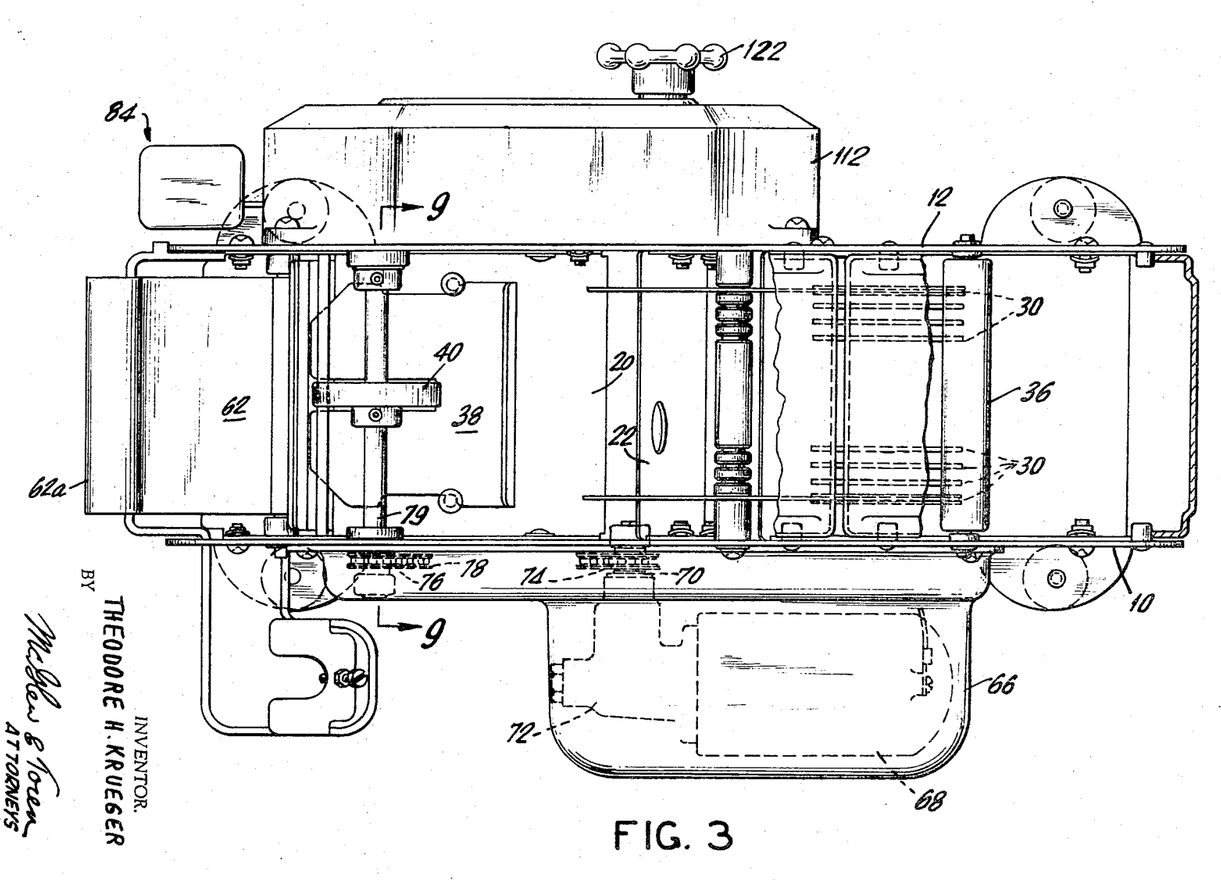
FIG. 3 is a top view of the machine with the front and rear covers removed and with the bottle holder for the moistening device (not shown)
Figure 4:
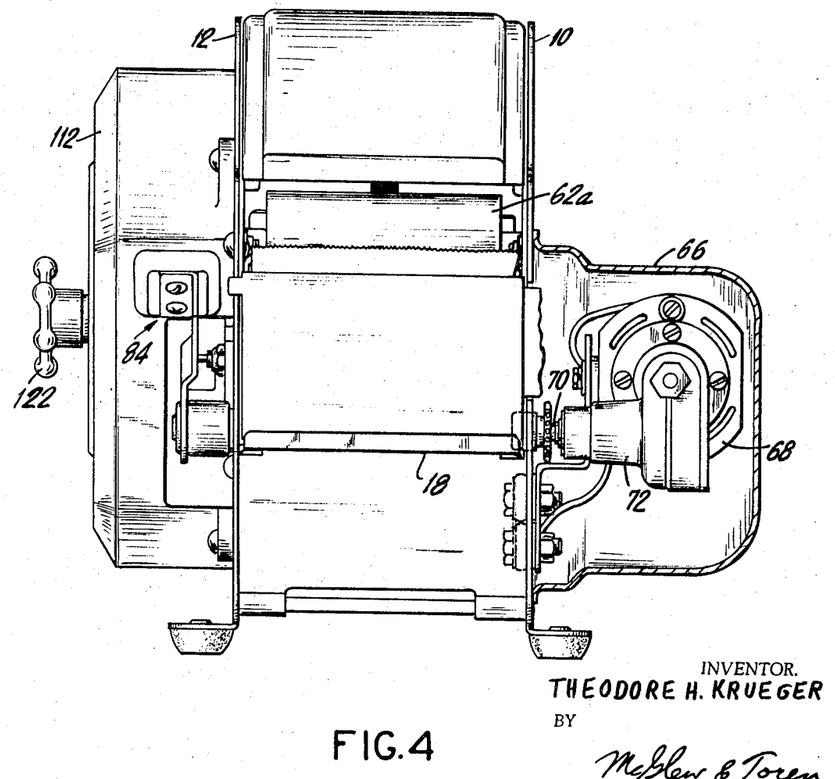
FIG. 4 is a partial front elevational and sectional view taken along the lines 4—4 of FIG. 1.

Referring, in particular, to FIGS. 3 and 4, there is indicated a drive compartment 66 which extends outwardly from the side frame 10 and defines a space for a driving motor 68 which rotates a shaft 70 through a speed reducer or speed gearing 72. Shaft 70 is provided with a driving sprocket 74 which drives a sprocket 76 through a chain 79 (FIG. 3). The sprocket 76 is affixed to a feed shaft or drive shaft 78 for rotation therewith. The upper feed roller 40 is keyed to the feed shaft 78.

In accordance with the invention, means are provided for initiating the driving feed connection between the motor and the cooperating feed rollers 40 and 42 to move the tape 34 into association with the cutter means 44 and the moistening means 45 and to dispense a selected length of tape out through the forward end of the tape dispenser housing. In the embodiment of the invention illustrated, the motor 68 is advantageously connected to a power source through a switch 80 (FIG. 6) which is actuated by a roller actuator 82 but it should be appreciated that the switch 80 may be eliminated and the motor connected so that it operates continuously when the machine is to be employed.

Figure 2:
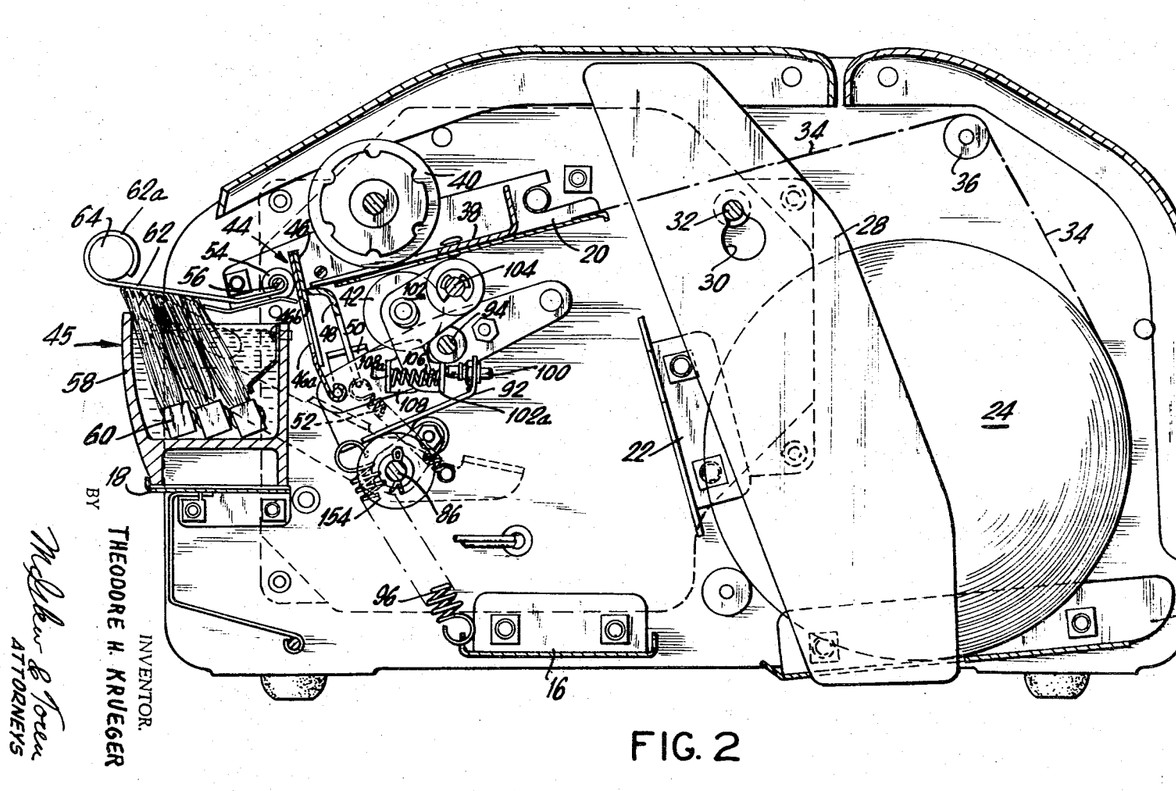
FIG. 2 is a view from a right side of the machine taken along the lines 2—2 of FIG. 1 with the side cover removed.

The means for starting each cycle of operation of the device includes an operating lever or actuator generally designated 84 which is keyed to a shaft 86 (FIGS. 5 and 8) which carries an offset or crank arm portion 60. The lever 84 may be shifted from the solid line position corresponding to the "neutral" or "at rest" position to the dotted line position indicated in FIG. 5 which corresponds to the "actuated" position. The rotation of the shaft 86 causes the offset crank arm 88 (FIG. 8) which carries a roller 90 at its outer end to move in a direction to cause the roller 90 to bear against the bottom side of a control or yoke member 92 to cause pivotal movement of this member in an upward direction, that is, clockwise as seen in FIG. 2 about its pivotal supporting rod or shaft 94. A spring 96 is anchored to the cross plate 16 at one end and is connected to the yoke 92 in a manner to bias it in a counterclockwise direction (FIG. 2). The dimensioning of the lever 84 and the offset arm portion 88 and the yoke member 92 is such that the lever may be moved so that the roller 90 is moved to an "over center" position beyond a perpendicular line drawn from the bottom side of the roller contact point 90 with the yoke 92 and the center of the shaft 86. The pressure exerted on the roller 90 by the force of the spring 96 effectively locks the lever 84 in place in the down position against a lower stop 98 (see FIG. 5).

In accordance with a feature of the invention, the downward movement of the lever 84 to the "actuated" dash-dot line position indicated causes the yoke member 92 to move the movable cutter 46 upwardly so that an opening 46a therein will be aligned with the feed line of the tape to permit passage of the tape therethrough. This orients the movable cutter 46 so that a cutting edge 46b may be oriented directly over the tape in a position to effect cutting thereof. In addition, an adjustable set screw 100 carried by the yoke 92 is moved in a direction toward engagement with an abutment or heel 102a of a lever member 102 which is mounted for pivotal movement about a shaft 104. This causes the exertion of an upward movement pressure through a compression spring 106 on a heel 108a of an arm 108 which carries the lower feed roller 42. The lower feed roller is an idler which causes driving engagement of the tape 34 when it moves against the underside of the tape to force it into driving engagement with the rotatable drive idler 40. When the lever 102 is moved, it causes compression of the spring 106 to an extent to permit the idler roller 42 to raise upwardly against the tape and the roller 40. The tension on the spring 106 gives a proper gripping pressure on the tape by the rollers 42 and 40 and also compensates for any differences in thickness of the tape being fed. By the time the feed rollers 40 and 42 grip the tape, they are being revolved by the motor which has been started by the control mechanism acting on the roller actuator 82 (FIG. 6).

Figure 1:
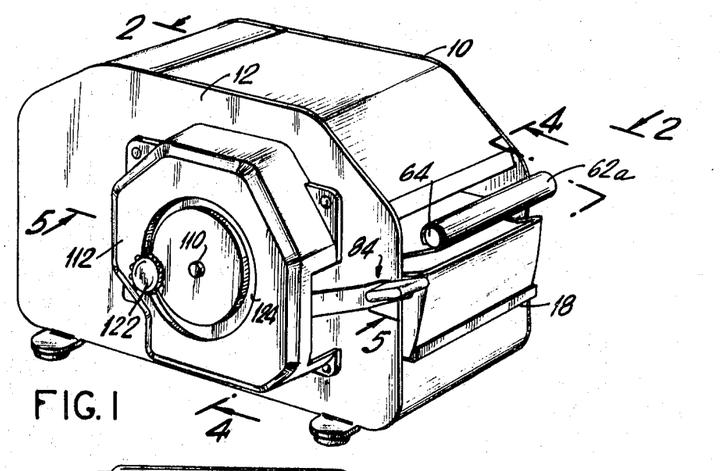
FIG. 1 is a front left perspective view of the tape dispensing machine constructed in accordance with the invention.
Figure 5:
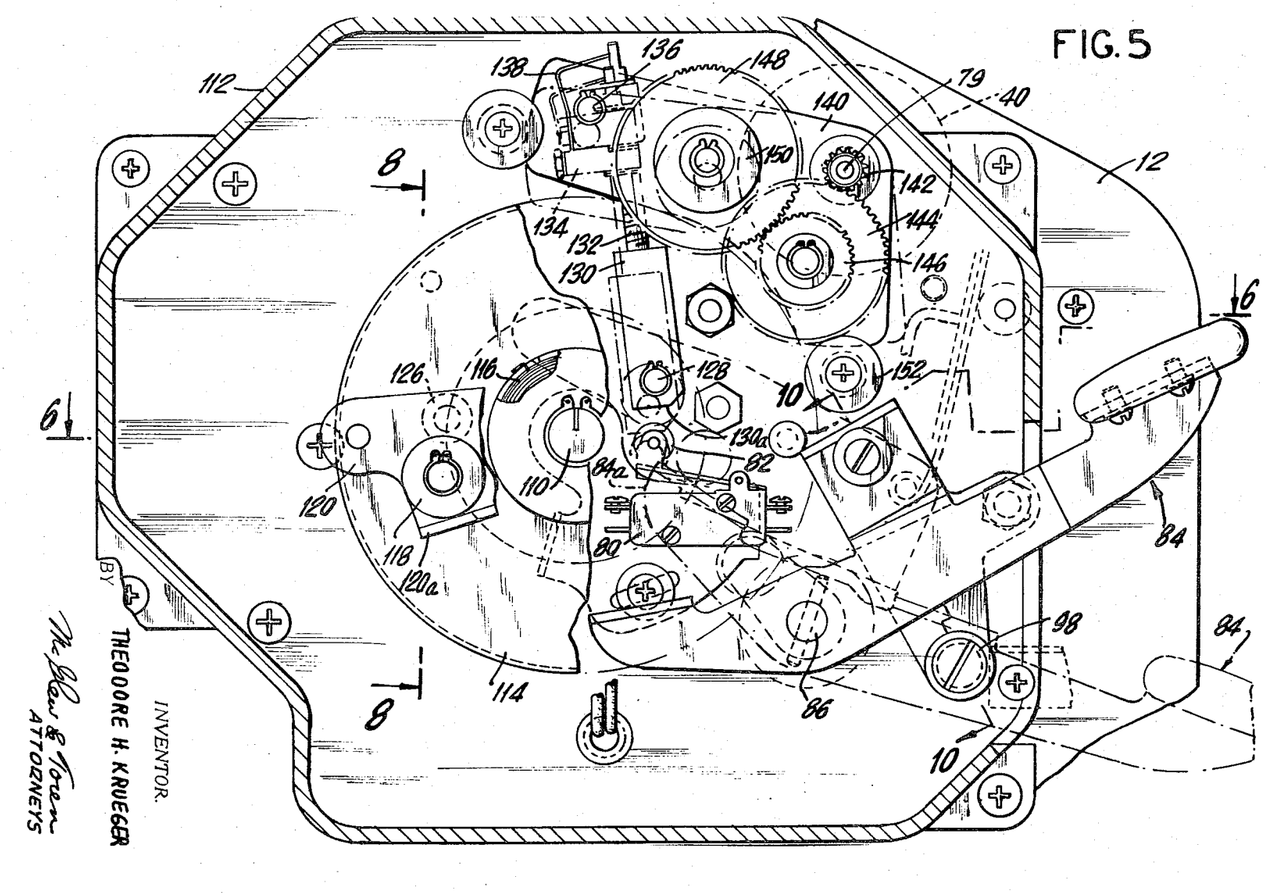
FIG. 5 is a section taken along the lines 5—5 of FIG. 1.
Figure 6:
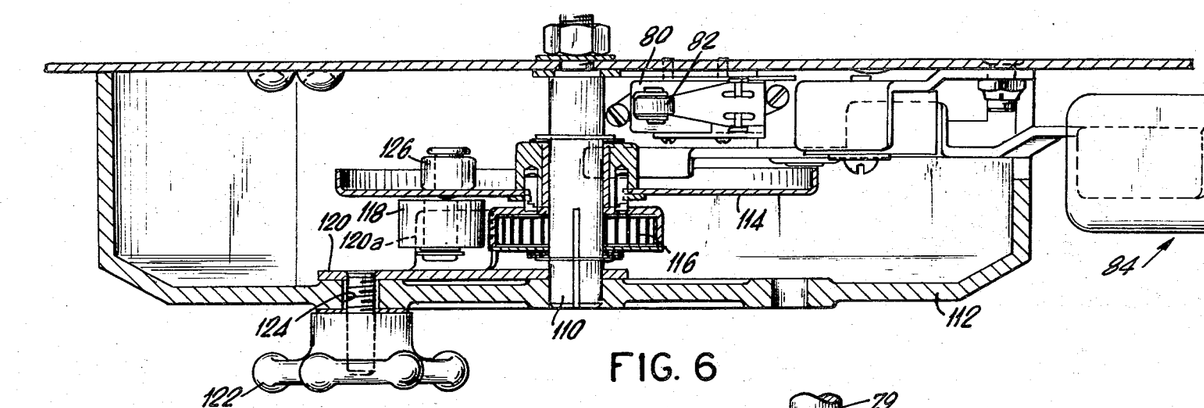
FIG. 6 is a section taken on the lines 6—6 of FIG. 5.
Figure 7:
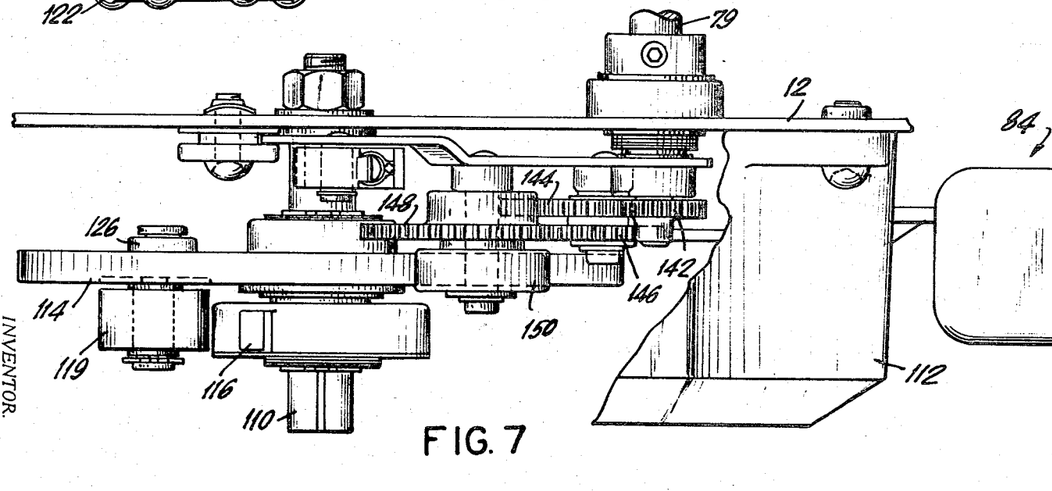
FIG. 7 is a top view partly broken away showing the friction drive for the measuring wheel.
Figure 8:
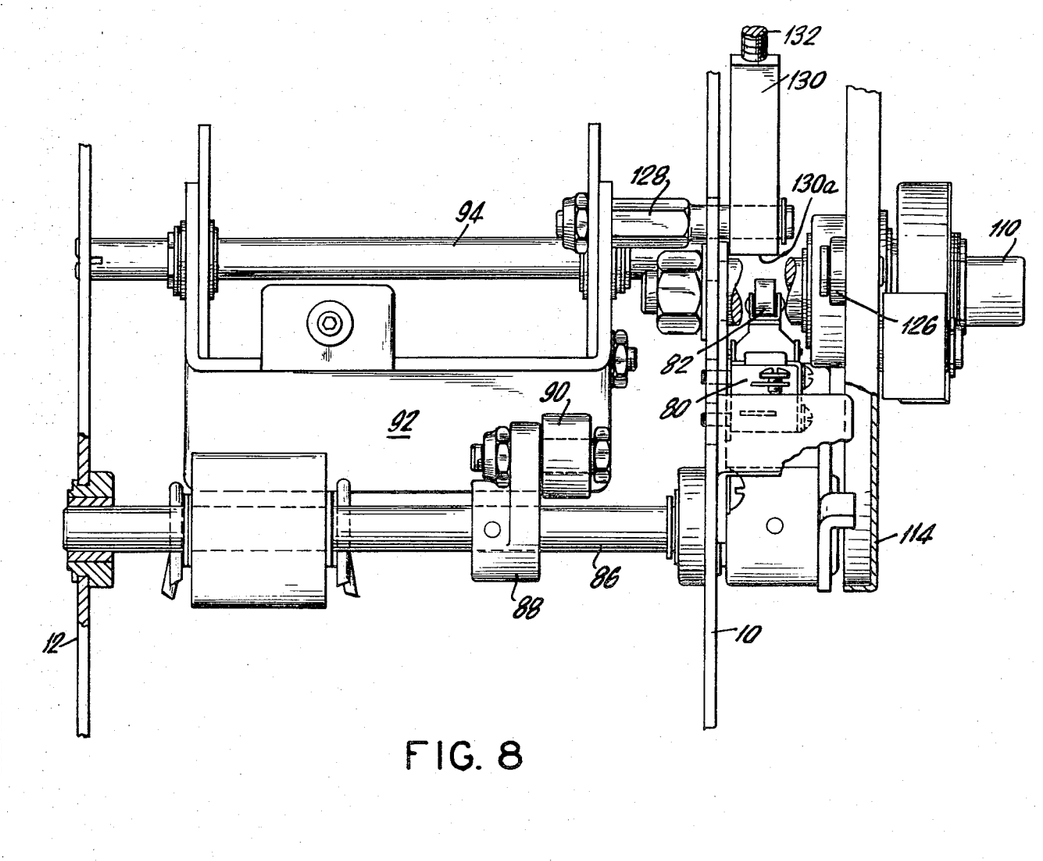
FIG. 8 is a section taken along the lines 8—8 of FIG. 5.

The control mechanism for initiating the start of the feed motor and the measuring mechanism for measuring the length of the tape which is to be fed during each feeding cycle is best described in reference to FIGS. 5, 6 and 8. A supporting stud 110 (FIG. 6) is disposed in a measuring mechanism housing 112 secured to the side frame 12 and a measuring wheel or disc 114 is rotatable thereon and is urged in counterclockwise direction as shown in FIG. 5 by a clock-type spring 116 which is wound around the stud 110. Counterclockwise rotation of the measuring wheel 114 will continue until the stop 118 strikes against a heel portion 120a of a stop lever 120 which is pivoted on the stud 110 which will stop the drive of the wheel and permit its return under the influence of the spring 116 as will be described more fully hereafter. The stop lever 120 can be rotated around the stud 110 by moving a handle or nut member control 122 which engages the lever member 120 through a slot 124 which extends around the periphery of the housing 112 (see FIGS. 1 and 6). The stop lever 120 is positioned in accordance with the length of tape which is to be fed and for this purpose the space on the cover surrounding the slot 124 may include indications for the setting of the hand nut 82. The position of the stop lever determines the starting position of the measuring wheel 114 and hence the duration of its movement before it causes the stopping of the feed and the cutting of the tape.

The measuring wheel 114 also carries a roller 126 which rotates about a stud formation 128. The roller 126 is radially located on the measuring wheel 114 so that when the operating lever 84 is in the down position or actuated position, a rear portion 84a thereof is disposed in the path of movement of the roller 126 so that the continued movement of the measuring wheel 114 will cause the return movement of the operating lever to the solid line non-operative position indicated in FIG. 5. When the operating lever 84 is in its up (non-operative) position, it will be clear of the path of travel of the roller 126.

Figure 9:
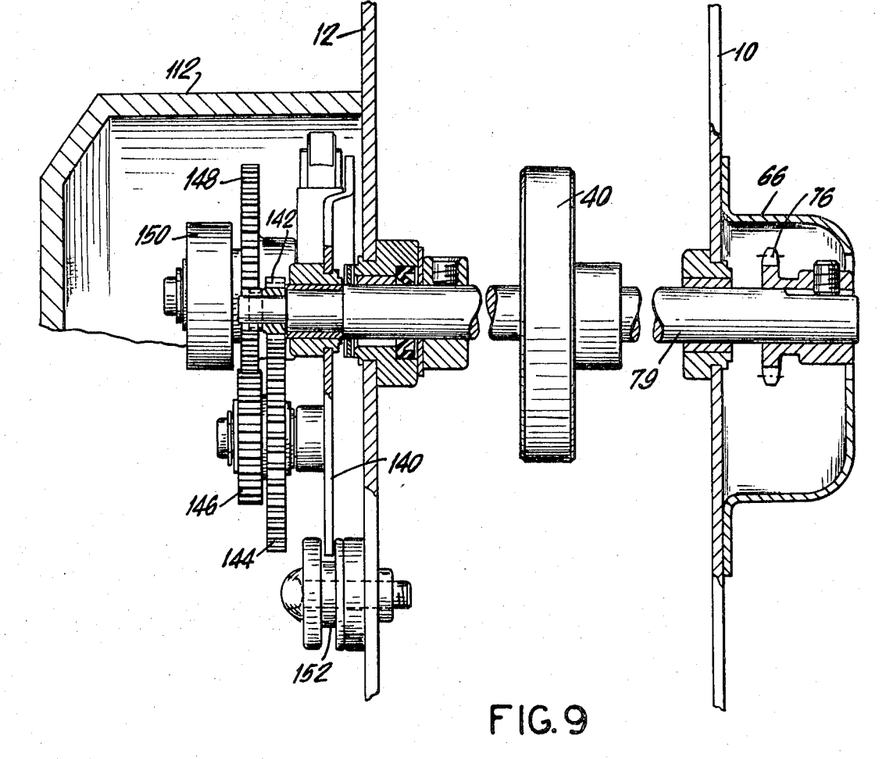
FIG. 9 is a partial sectional view taken along the lines 9—9 of FIG. 3.
Figure 10:
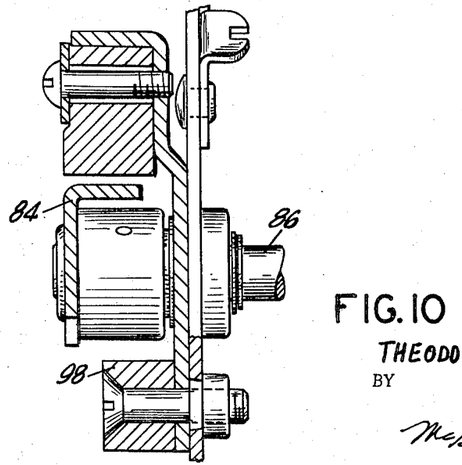
FIG. 10 is a section taken along the lines 10—10 of FIG. 5.

As shown in FIGS. 5 and 8, the end of the yoke 92 which is opposite to the movable blade 46 (FIG. 2) carries a stud 128 which protrudes through a hole in the frame 10. When the yoke 92 is raised by the lever 84 and the roller 90, the stud 128 is moved downwardly. The stud 128 carries a block 130 in which is threadably secured a study or threaded member 132 which is threaded at its upper end into a block 134 and retained by rings 136 (FIG. 5). Also fastened to the block 134 is a leaf spring 138 which acts as a locking device for the stud 132. These parts form a connecting rod unit constructed to permit a variation in the distance between the stud 128 and the stud 132. The stud 132 is riveted to a plate 140 (FIG. 5) which carries a train of gears 142, 144, 146 and 148 which drive a friction wheel 150 for driving the measuring wheel 114 from the feed shaft 78. Grooved bushings 152 engage the ends of the plate 140 (FIGS. 5 and 9) and act as guides therefor. When the yoke member 92 carrying the stud 128 is moved downwardly, it also pivots the plate 140 around the shaft 78 carrying with it the gear train and the friction wheel 150. Since the friction wheel 150 is aligned with the measuring wheel 114, the measuring wheel 114 will be engaged by the friction wheel and rotated thereby during the feeding of the tape to measure the amount of tape which is dispensed.

As the block 130 is lowered, its bottom end 130a (FIGS. 5, 6 and 8) engages the roller actuator 82 to actuate the switch 80 to close the circuit to the driving motor 68 (FIG. 4). The motor 68 then rotates the feed roller 40 along with its shaft 79 and the friction wheel 150 is driven through the gears 142, 144, 146 and 148 to rotate the measuring wheel 114. The feed rollers 40 and 42 move the tape 34 under the cutting blade 46b and over the moistening brushes 16. The drive of the friction wheel 150 with the measuring wheel 114 causes the rotation of the wheel 114 in a clockwise direction as indicated in FIG. 5 to cause the stop 118 and the roller 126 to be angularly displaced from their starting positions to move against the heel 120a of the lever plate 120 at a time in accordance with its initial position. The motor 68 will continue to run to feed the tape until the roller 126 engages the rear of the end 84a of the operating lever 84 and pushes it out of its path of travel to move the operating lever from the operating position shown in dot and dash lines in FIG. 5 back to the neutral position (solid line position). This returns the yoke 92 to its original position assisted by the return action of the spring 96. The yoke 92 will rest against the stop 154 held down by its spring 96. The block 130 will move upwardly to release the roller actuator 82 to open the circuit to the motor 68 and stop the motor. The plate 140 will also be moved upwardly disengaging frictional contact between the friction wheel 150 and the measuring wheel 114. This permits the measuring wheel 114 to return by the urging of its spring 116 until the stop 118 engages the heel 120a of the lever 120. When the yoke 92 moves downwardly, it carries with it the moving blade 46 to cut the length of tape 34 to the length set by the stop lever 120 as fixed by the adjustable handle member 122.

The cycle is completed by the return of the actuating lever 84 to the solid line position which is in a position ready for actuation of the next cycle. The amount of tape which is fed is proportional to the angular displacement of the measuring wheel 114 and hence the initial position of this measuring wheel as determined by the position of the lever 120 will determine the amount at which it will be displaced to effect the actuation of the motor drive and stopping thereof, the cutting and the return of the parts to the actuator position.

While a specific embodiment of the invention has been shown and described in detail to illustrate the application of the inventive principles, it will be understood that the invention may be embodied otherwise without departing from such principles.

What is claimed is:

1. A device for dispensing tape and similar strip material, comprising a pair of first and second cooperating feed rollers between which the tape is to be fed, means for rotating said first feed roller, means mounting said second feed roller for movement toward said first feed roller at a location to urge the tape to be fed against the first feed roller and advance between said first and second feed rollers in a tape feeding direction, cutting means disposed along the tape feeding direction including a movable cutter movable in a cutting direction through the path of feed of the tape to cut the tape and movable in a return direction back across the feed of the tape, tape measuring means connected to said means for rotating said first feed roller including a measuring member movable during rotation of said feed roller, a hand operated actuator movable between an actuated position and a non-actuated position spaced from said actuated position, and means responsive to movement of said hand operated actuator to displace said second feed roller mounting means to move said second feed roller toward said first feed roller to initiate the feed of the tape, to move said movable cutter first in a return direction, and to initially hold said hand operated actuator in an actuated position, said movable measuring member being engageable with said hand operated actuator after a predetermined movement of said member to return said hand operated actuator to a non-actuated position to cause movement of said second feed roller away from said first feed roller to discontinue the feed of the tape, to move said movable cutter in a direction to cut the tape, and to permit return movement of said measuring member.

2. A device according to claim 1 wherein said means mounting said second feed roller includes a lever member pivotally supported adjacent said first feed member and being movable toward and away from said first roller, and spring means biasing said second feed roller in a direction toward said first feed roller.

3. A device according to claim 2, including a yoke member pivotally mounted below said lever member, said hand operated actuator including a crank arm portion engageable below said yoke member to pivot said yoke member to said lever member toward and away from said first roller, spring means biasing said yoke member downwardly on said crank arm portion, said crank arm portion being movable beyond dead center in respect to said yoke member and being retained by said yoke member to hold said hand operated actuator in an actuated position.

4. A device according to claim 1, wherein said measuring means comprises a rotatable wheel member and drive means connected between said means for rotating said first roller and said wheel member to rotate said wheel member when said first roller is cooperating with said second roller for feeding tape therebetween.

5. A device according to claim 4, including a fixed stop, spring means urging said measuring wheel member in a rotational direction to cause a portion thereof to abut against said stop, and hand operating setting means connected to said stop wheel for displacing said stop in order to vary the amount of the movement of said measuring wheel member during each cycle of operation.

6. A device according to claim 5, wherein means for rotating said first feed roller include an electrical motor, switch means for actuating said motor, and means movable by movement of said hand actuator to actuate said switch means to start said motor to drive said first feed wheel roller and to deactuate said motor when said hand operated actuator is returned to a non-actuated position.

7. A device according to claim 1, wherein said means responsive to movement of said hand operated actuator includes a yoke member pivotally mounted at one end, said actuator comprising a lever having a crank arm portion with a roller bearing against said yoke member, means urging said yoke member downwardly against said crank arm member, said crank arm member being located in an over center position when said hand operated actuator is moved to an actuated position held by said yoke member against return movement.

8. A device according to claim 7, including a gear drive mounting plate, a drive shaft for said first roller rotatably supporting said gear driving mounting plate, said measuring means comprising a rotatable measuring wheel, a plurality of gears carried on said gear drive measuring plate driving from said first roller drive shaft to said measuring wheel to rotate said wheel during feeding of said tape.

9. In a tape dispensing device, including means for feeding a length of tape from a roll thereof, including a pair of cooperable rollers, one of which is movable toward and away from the other to effect engagement and driving of the tape and disengagement of the tape, one of said rollers being rotatable, and wherein cutting means are provided for cutting the tape which is fed which includes a cutter movable between non-actuated and actuated positions on respective sides of the path of movement of the tape, the improvement comprising an actuator movable between an actuated position and a non-actuated position spaced from said actuated position, and means responsive to movement of said actuator for engaging the cooperable rollers for driving the tape to initiate feed of the tape and for moving the cutter initially from an actuated to a non-actuated position overlying the tape, means engageable with said actuator in an actuated position to hold it in an actuated position, and measuring means connected to said feed means and being movable, when said rollers are engaged to feed tape through a predetermined distance, to engage said actuator and return it to a non-actuated position whereby to permit feeding of the tape and to permit return of said measuring means and to move the cutter to a non-actuated position.

10. In a device according to claim 9, including an electric motor connected to at least one of said feed rollers, switch means for operating said motor, said hand operated actuator being connected to operate said switch means when moved to an actuated position to connect said motor to drive at least one of said feed rollers.

11. A device for dispensing tape and similar strip material comprising, a feed rollar shaft, an electric motor connected to said shaft for rotating said shaft, a first feed roller carried on said feed shaft and being rotatable therewith, a second feed roller mounting bracket pivotally mounted below said first feed roller, a second feed roller rotatably carried on said mounting bracket, said second feed roller mounting bracket being movable toward and away from said first feed roller, a yoke member pivotally mounted adjacent said second feed roller mounting bracket( a hand operated actuating lever having a crank arm engaged below said yoke member, spring means biasing said yoke member downwardly into engagement with said crank arm, said actuating lever being movable to an actuated position to present said crank arm below said yoke member and held in a position beyond dead center by said yoke member to hold said actuating member in an actuated position, tape measuring means including a measuring member movable during a driving position of said second feed roller with said first feed roller to feed tape, means actuated by said yoke member to drivingly connect said measuring wheel with said feed shaft when said second roller is in a driving position in respect to said first roller, said measuring roller having means engageable with said actuating lever to return said actuating lever to a non-actuated position and to return said actuating lever to a non-actuated position and to return said second roller to a position out of driving engagement with said first roller.

12. A device according to claim 11, including a cutter comprising a fixed element underlying said tape and a movable blade element movable downwardly adjacent said fixed cutting element to sever the tape, said movable blade being liftable by said yoke member upon movement of said actuating lever to an actuated position.

13. A device for dispensing tape and similar strip material comprising, a feed roller shaft, an electric motor means connected to said shaft for rotating said shaft, a first feed roller carried on said feed shaft and being rotatable therewith, the second feed roller mounting bracket pivotally mounted below said first feed roller, a second feed roller carried on said mounting bracket, said second feed roller mounting bracket being movable toward and away from said first feed roller, a yoke member pivotally mounted adjacent said second feed roller mounting bracket, a hand operated actuating lever having a crank arm engaged below said yoke member, spring means biasing said yoke member downwardly into engagement with said crank arm, said actuating lever being movable to an actuated position to present said crank arm below said yoke member and held in a position beyond dead center by said yoke member to hold said actuating member in an actuated position, tape measuring means including a measuring member connected to said shaft and movable during a driving position of said second feed roller with said first roller to feed tape and engageable with said actuating lever to return said actuating lever to a non-actuated position and to return said second roller to a position out of driving engagement with said first roller.

14. A device for dispensing tape and similar strip material comprising, a feed roller shaft, motor means connected to said shaft for rotating said shaft, a first feed roller carried on said feed shaft and being rotatable therewith, the second feed roller mounting bracket pivotally mounted below said first feed roller, a second feed roller carried on said mounting bracket, said second feed roller mounting bracket being movable toward and away from said first feed roller, a yoke member pivotally mounted adjacent said second feed roller mounting bracket, a hand operated actuating lever having a crank arm engaged below said yoke member, spring means biasing said yoke member downwardly into engagement with said crank arm, said actuating lever being movable to an actuated position to present said crank arm below said yoke member and held in a position beyond dead center by said yoke member to hold said actuating member in an actuated position, tape measuring means including a measuring member connected to said shaft and movable during a driving position of said second feed roller with said first feed roller to feed tape and engageable with said actuating lever after a predetermined movement to return said actuating lever to a non-actuated position and to return said second roller to a position out of driving engagement with said first roller, a second roller counter lever pivotally mounted adjacent said second roller mounting lever, spring means between said second roller mounting lever and said second roller counter lever, said yoke member being engageable with said counter lever to urge it against said spring means and said mounting lever to urge said mounting lever to cause engagement of said second roller with said second feed roller.

15. A device for dispensing tape and similar strip material comprising, a feed roller shaft, an electric motor connected to said shaft for rotating said shaft, a first feed roller carried on said feed shaft and being rotatable therewith, the second feed roller mounting bracket pivotally mounted below said first feed roller, a second feed roller carried on said mounting bracket, said second feed roller mounting bracket being movable toward and away from said first feed roller, a yoke member pivotally mounted adjacent said second feed roller mounting bracket, a hand operated actuating lever having a crank arm engaged below said yoke member, spring means biasing said yoke member downwardly into engagement with said crank arm, said actuating lever being movable to an actuated position to present said crank arm below said yoke member and held in a position beyond dead center by said yoke member to hold said actuating member in an actuated position, tape measuring means including a measuring member movable during a driving position of said second feed roller with said first feed roller to feed tape, means actuated by said yoke member to drivingly connect said measuring wheel with said feed shaft when said second roller is in a driving position in respect to said first roller, said measuring roller having means engageable with said actuating lever to return said actuating lever to a non-actuated position and to return said second roller to a position out of driving engagement with said first roller, said measuring roller having a projection thereon, means defining an adjustable stop located alongside said measuring wheel and being adjustably positionable in respect to said wheel, said wheel being displaceable to position said wheel projection against said stop, and spring means urging said wheel in a direction to engage said projection with said stop.

References Cited

UNITED STATES PATENTS 1,732,636 10/1929 Gautier et al. ______ 83—241 X
3,176,563 4/1965 Sharpe ____________ 83—241

JAMES M. MEISTER, Primary Examiner

U.S. Cl. X.R.
83—241, 261; 226—136.